United States Patent Office 3,511,704
Patented May 12, 1970

3,511,704
ELECTRICALLY CONDUCTIVE FLOCK FOR ELECTROSTATIC FLOCKING
Daniel Wyss and Walter Wyss, Emmenbrucke, and Erwin Lerch, Stollberg, Switzerland, assignors to Societe de la Viscose Suisse, Lucerne, Switzerland, a Swiss corporation
No Drawing. Continuation-in-part of application Ser. No. 298,568, July 30, 1963. This application Mar. 8, 1967, Ser. No. 621,450
Int. Cl. B44d 1/18
U.S. Cl. 117—215                                7 Claims

ABSTRACT OF THE DISCLOSURE

Electrically conductive flock formed from a polymer selected from the group consisting of polyamides, polyesters, polyacrylonitriles, and cellulose esters which is suitable for electrostatic flocking. The flock is coated with a composition containing (in percent of flock weight) about 0.1 to 3.0 percent tannin and about 0.01 to 0.3 percent antimony (such antimony being present in the form of an antimony compound).

---

This is a continuation-in-part application of Ser. No. 298,568 filed July 30, 1963, now U.S. Pat. 3,322,554, issued May 30, 1967. The present invention is directed to electrically conductive flock, and more particularly to electrically conductive flock suitable for electrostatic flocking.

The object of this invention is electrically conductive flock having a good flow and excellent spring capacity in an electrostatic field and being very suitable for electrostatic flocking. Other objects will appear hereinafter.

The manufacture of plush, velvet, suede, and the like by the application of short fibers, called flock, to an adhesive-coated base under the influence of a high tension electrostatic field is a well known process, described for example in U.S. Pat. Nos. 2,173,032 and 2,173,078. Hitherto, the fibers used for this purpose have been mainly rayon fibers. Recently, however, the use of other man-made fibers, such as fibers made from cellulose esters, polyamides, polyesters, and polyacrylonitriles, has become more prominent because of the good properties of these materials. For the manufacture of articles which are exposed to considerable wear and tear, such as carpets or upholstery, nylon flock has, for example, proved to be a very suitable material.

When using man-made fibers in electrostatic flocking processes, difficulties however arise, resulting from the different behaviour of the various materials. While rayon fibers, like natural cellulose fibers, are rather hydrophilic, fibers made from cellulose triacetate and many purely synthetic polymers are more or less hydrophobic and are easily given electrostatic charges by friction. It is known that such charges are very troublesome in ordinary spinning and weaving processes of fibers and yarns; they produce however especially great difficulties in electrostatic flocking processes.

In order to obtain a dense and uniform pile, the single flock fibers must be able to glide smoothly over each other and must flow easily through a metal sieve in the flocking apparatus. They must furthermore spring quickly between the two electrodes of the electric field, until they are finally trapped by the adhesive-coated base. The flow and gliding properties of flock can be improved by the application of softening agents, but a good spring capacity in the electric field depends above all on the electrical conductivity of the fibers.

If this conductivity is low, the flock fibers tend to cling to each other and to the electrodes and spring only slowly or not at all. Frequently, they also form thick, hard clusters of fibers, which cannot pass the sieve and become completely useless.

To overcome these difficulties, it has been suggested to carry out electrostatic flocking at high humidities, as it is known that the conductivity of the fibers depends on their moisture content. A high humidity is however detrimental to the formation of a high tension electric field. Therefore, the problem is usually dealt with by treating the fibers with antistatic agents, which form on the fibers a coating of substances having a good electrical conductivity, a procedure long adopted in ordinary spinning and weaving processes. The antistatic agents proposed for this purpose belong to many different chemical classes, but most of them are ionized, or at least polarized, substances, such as simple electrolytes or surface active agents of cationic, anionic, or non-ionic character. Mineral dispersions, e.g. of calcium carbonate or silica, sometimes mixed with oily lubricants, have also been recommended for this purpose.

Thus, United States Pat. No. 2,917,401 describes the preparation of an anti-electrostatic agent made by the reaction of silicon tetrachloride with ethyl acetate and aqueous alcohol. French Pat. No. 1,257,894 proposes the use of suspensions of montmorillonite, a mineral well known for its swelling properties in water, and French Pat. No. 1,157,657 describes, for the same purpose, mixtures of surface active agents with paraffin oil and silica. The antistatic effect of mixtures containing highly dispersed silica and oily lubricants is mentioned in an article in Melliand's Textilberichte, 33 (1952) 957.

All these anti-electrostatic agents are however only applicable to ordinary textile operations, such as spinning, twisting, and weaving. For the treatment of fibers for electrostatic flocking processes they are either ineffective or even disadvantageous, because of their content of oily or fatty lubricants. To avoid these difficulties, British Pat. No. 686,101 proposes to treat rayon or triacetate fibers with aqueous dispersions of calcium carbonate, magnesia, or silica, and German Pat. specification No. 1,040,497 describes treatment of nylon flock with condensation products of higher fatty acids with aliphatic or aromatic aminosulphonic acids. Finally, German Pat. application 1,098,913 proposes the treatment of flock with well known anti-electrostatic agents, such as polyglycol esters or phosphoric acid esters with the addition of potassium and sodium salts. The present invention provides a process for electrostatic flocking with man-made fibers in which by a novel method good flow- and gliding properties and a good spring capacity in an electrostatic field are imparted to the flock fibers by a new anti-electrostatic combination, while the mechanical properties of the fibers are not impaired. This is a continuation-in-part application of application Ser. No. 298,568 of July 30, 1963, now U.S. Pat. 3,322,554 issued May 30, 1967.

According to the present invention a process for preparing pile fabrics such as plush, velvet, suede and the like comprises (1) treating man-made flock fibers with an acidified aqueous solution of tannin, adding potassium antimonyl tartrate to the said solution and continuing the said treatment, and separating and drying the said flock fibers, and (2) securing the flock fibers thus obtained to an adhesive-coated base under the influence of a high tension electrostatic field.

In this specification, the term "tannin" includes gallic acid and digallic acid as well as the various types of tannin. Potassium antimonyl tartrate is the preferred antimony source. In its place, antimony trifluoride, potassium antimony fluoride, antimony lactate, or antimony sodium thioglycolate may be used.

The use of tannin and potassium antimonyl tartrate as auxiliaries in certain dyeing processes is known, e.g., in dyeing natural and regenerated cellulose fibers with basic dyes and for improving the wet fastness of acid wool dyes. It is also known to treat synthetic fibers and textiles, especially stockings, with solutions containing alum, tannin, and aluminum acetate to improve their durability. Synthetic fibers have also been treated with tannin solutions to make them smooth and waterproof. The use of tannin and potassium antimonyl tartrate as anti-electrostatic agents for man-made fibers has, however, not been described.

The treatment of man-made fibers with tannin and potassium antimonyl tartrate is very effective in producing fibers of good electrical conductivity which possess an excellent spring capacity in an electrostatic field. The treatment is equally applicable to dyed and undyed fibers, and an additional advantage is the durability of the antistatic effect. The fibers treated in accordance with the invention keep their good spring capacity even after prolonged storage; moreover, they are insensitive to changes of temperature and humidity of the air produced by changes of weather and seasons. Another advantage of the process is that the agents used need only be employed in very low concentrations.

A further improvement of the properties of the fibers for electrostatic flocking processes, especially of their flowing and gliding properties, can be obtained, if after their treatment with tannin and potassium antimonyl tartrate, the fibers are treated with an aqueous solution containing an anionic finishing agent, and, optionally, also a water-soluble alkali metal or ammonium salt. As the salt, sodium sulphate or ammonium sulphate may be used, and sodium silicate in the form of water-glass is also effective, especially if the solution is made faintly acid. A further modification is possible by treating the fibers before the treatment with the tannin solution with an aqeous solution of an alum, preferably potassium aluminum sulphate, or any other water-soluble aluminum salt, such as aluminum sulphate or aluminum acetate.

The known antistatic effects of these finishing agents and alkali metal salts are quite insufficient to impart to the flock fibers a good, durable spring capacity when used alone. Only in combination with the tannin and potassium antimonyl tartrate treatment do they serve to improve the flocking qualities of the fibers. Tannin may be replaced by gallic acid or digallic acid.

Other phenolic compounds have however, a much smaller anti-static effect.

The combination of agents which give, in any particular case, the best effect depends on the nature, titer, and length of the fibers treated. Generally the treatment with tannin and potassium antimonyl tartrate is followed by a treatment with an anionic finishing agent, mixtures of cetyl alcohol and cetyl alcohol sulphonates being preferred.

To carry out the treatment of the invention, the flock fibers are dispersed in an aqueous solution at, e.g. about 70° C., acidified by the addition of acetic acid, and containing preferably between 0.04 and 0.2 percent by weight of tannin. Ordinarily the dispersion is stirred for 10 minutes, 0.01 to 0.05 percent by weight of potassium antimonyl tartrate is then added, and stirring is continued for another 10 minutes. To remove the adhering solution, the fibers are centrifuged for 10 minutes and finally dried. If it is desired to apply a finishing treatment, the drying is omitted, and the fibers are, following centrifuging, transferred to an aqueous solution at, e.g., about 50° C. containing preferably, between 0.2 and 1.0 percent by weight of the finishing agent and stirred for about 25 minutes. The fibers are then centrifuged again and dried.

If, in addition, alkali metal or ammonium salts are to be used, between 0.3 and 1.5 percent by weight of such substances is added to the finishing bath. If sodium silicate is employed as the alkali metal salt, it is recommended to prepare a solution of the required strength, and, prior to addition of the finishing agent, to add acetic acid, so that the pH of the solution is less than 7.5 and preferably between 4 and 5. It is further recommended to use, in combination with sodium silicate, the sodium salt of cetyl alcohol sulphonic acid as finishing agent. Otherwise, the preferred procedure is the same as if a finishing treatment without the addition of an alkali salt is applied.

If the flock fibers are to be pre-treated with an alum, the fibers are dispersed in an aqueous solution at, e.g., 70° C. acidified by addition of acetic acid and containing between 0.02 and 0.1 percent by weight of an alum, usually potassium aluminum sulphate. The dispersion is then stirred for 10 minutes, and tannin and, subsequently, potassium antimonyl tartrate are added, the treatment being carried out, as described above, either with or without the use of anionic finishing agents and alkali or ammonium salts.

The process described in its various modifications imparts to flock a coating containing 0.1 to 3.0 percent by weight of tannin and 0.01 to 0.3 percent by weight of antimony in the form of an antimony compound, all percentages referring to the total flock weight. When pre-treated with alum, the flock coating contains, in addition 0.001 to 0.03 percent by weight of aluminum in the form of an aluminum compound. When finished with a solution containing an anionic finishing agent and an alkali metal or ammonium salt, the flock coating also contains varying amounts of these substances. The flock processed has a length of between 0.1 and 10 millimeters. The preferred length is 0.3 to 4 millimeters.

The weight ratio between fibers and solutions should vary between 1 to 15 and 1 to 25; usually 1 part of fibers requires 20 parts of solution. It is recommended, prior to treatment, to remove any oily or fatty sizes adhering to the fibers. This is simply done by washing the fibers in a warm bath containing soap or a synthetic detergent.

The man-made fibers treated according to the method described, are then secured to an adhesive-coated base under the influence of a high-tension electrostatic field in conformity with well-known processes.

Determination of tannin is carried out spectrophotometrically, using the high specific absorption of tannin solutions at a wavelength of 275 m$\mu$. Usually, the residue tannin content of the aqueous tannin solution applied is determined, from which the tannin take-up of the flock is easily inferred. As Example IV describes, the results so obtained are identical with those of a direct tannin determination of a solution of tannin-coated flock in a 1:1 mixture of methanol and hydrochloric acid.

Antimony is determined polarographically in the form of trivalent antimony ion. For this purpose, polyamide and cellulose triacetate flock are dissolved and hydrolyzed in hydrochloric acid under nitrogen at 110° C. Polyester and polyacrylonitrile flock are decomposed by means of sulphuric and nitric acids, and the solution obtained is further treated with perchloric and hydrochloric acids. As polyester flock often contains antimony as a result of the use of antimony catalysts, a control test of untreated polyester flock must be made, and the antimony content found is to be deducted from the total antimony content of the treated flock, the difference being the antimony content of the coating.

For determination of aluminum, the flock is decomposed by means of sulphuric acid and hydrogen peroxide. By the addition of 8 - hydroxy - quinoline, aluminum-8-hydroxy-quinolate is formed which is determined spectrophotometrically.

The following examples illustrate the invention:

EXAMPLE I 50 grams of polyhexamethylene adipamide fibers of 2.5 mm. length and a titer of 2.2 tex [1] are dispersed in 1000 grams of an aqueous solution at 70° C. containing 0.25 gram of 80% acetic acid and 0.5 gram tannin. The dispersion is stirred for 10 minutes, 0.25 gram of potassium antimonyl tartrate are added, and stirring is continued for another 10 minutes. To remove the adhering solution, the fibers are centrifuged for 10 minutes and dried at 25° C. The fibers possess a good spring capacity in an electrostatic field and are very suitable for use in electrostatic flocking processes.

EXAMPLE II 50 grams of dyed polycaprolactam fibers of 2.5 mm. length and a titer of 2.2 tex are dispersed in 1000 grams of an aqueous solution at 70° C. containing 0.25 gram of 80% acetic acid and 0.5 gram tannin. The dispersion is stirred for 10 minutes, 0.25 gram of potassium antimonyl tartrate is added, and stirring continued for another 10 minutes. The fibers are then centrifuged for 10 minutes and dispersed in 1000 grams of an aqueous solution at 50° C. containing 3 grams of a mixture of cetyl alcohol and an ammonium sulphonate of cetyl alcohol, and stirred for 25 minutes. To remove the adhering solution, the fibers are centrifuged for 10 minutes and dried at 25° C. The fibers possess a good flow and good spring capacity in an electrostatic field. They kept these properties after a storage for 6 months and after temporary heating to 70° C., and are very suitable for electrostatic flocking processes. Fibers treated only with the anionic finishing agent solution did not possess any of these properties.

EXAMPLE III 50 grams of dyed polyhexamethylene adipamide fibers of 1 mm. length and a titer of 0.3 tex are dispersed in 1000 grams of an aqueous solution at 70° C. containing 0.5 gram of 80% acetic acid and 0.5 gram of potassium aluminum sulphate. The dispersion is stirred for 10 minutes, 1 gram tannin is added, and stirring is continued for 10 minutes, whereupon 0.25 gram of potassium antimonyl tartrate are added and the dispersion is stirred for another 10 minutes. The fibers are centrifuged for 10 minutes and dispersed in an aqueous solution at 50° C. prepared as follows: 8 grams of water-glass of specific gravity 1.4 are mixed with 1000 grams of water, 80% acetic acid is added until a pH of 4.5 is reached, and finally 3 grams of a mixture of cetyl alcohol and a sodium sulphonate of cetyl alcohol, are added. The fibers are stirred for 25 minutes in this solution, centrifuged for 10 minutes, and dried at 25° C. They possess a good flow and good spring capacity in an electrostatic field and kept these properties after a storage for 6 months and after temporary heating to 70° C. They are very suitable for electrostatic flocking processes.

Cellulose triacetate fibers of 0.5 mm. length and a titer of 0.3 tex, polyethylene terephthalate fibers of 1 mm. length and a titer of 0.3 tex, and polyacrylonitrile fibers of 2 mm. length and a titer of 1.5 tex, treated in the same way, also possess a good flow and good spring capacity in an electrostatic field, and are very suitable for electrostatic flocking processes. However, polyhexamethylene adipamide fibers, cellulose triacetate fibers, polyethylene terephthalate fibers and polyacrylonitrile fibers, which are only treated with an acidified aqueous solution containing water-glass and the aforesaid anionic finishing agent, possess an unsatisfactory spring capacity in an electrostatic field and are unsuitable for electrostatic flocking processes.

EXAMPLE IV 40 grams of polyhexamethylene adipamide flock of 3 denier and 1.5 mm. length are dispersed in 1000 grams of an aqueous solution of 70° C. containing 3 grams of 98% acetic acid and 0.8 gram of tannin. The dispersion

[1] To convert tex into denier, multiply by 9, so 2.2 tex equals 19.8 denier, etc.

is stirred for 10 minutes, 0.8 gram of potassium antimonyl tartrate is added, and stirring is continued for another 10 minutes. The flock is centrifuged for 10 minutes and dispersed in 1000 grams of an aqueous solution of 50° C. containing 8 grams of ammonium sulphate and 3 grams of an anionic finishing agent consisting of a mixture of cetyl alcohol and cetyl alcohol ammonium sulfonate. The dispersion is stirred for 25 minutes, the flock is centrifuged for 10 minutes, and is dried at 25° C. The flock possesses a good flow and excellent electric conductivity and spring capacity in an electrostatic field and is very suitable for electrostatic flocking.

The tannin content of the flock is determined (a) by direct determination dissolving the flock in a 1:1 mixture of methanol and hydrochloric acid, and (b) by indirect determination from the residue tannin content of the aqueous tannin solution applied. Both according to method (a) and method (b) the tannin content of the flock is 0.8 percent by weight. The antimony content of the flock is 0.04 percent by weight.

Polycaprolactam flock of 2 denier and 4 mm. length, polyethylene terephthalate flock of 1.5 denier and 0.75 mm. length, polyacrylonitrile flock of 3 denier and 4 mm. length, and cellulose triacetate flock of 2.5 denier and 3 mm. length, treated in the same way as polyhexamethylene adipamide flock, also possess a good flow and excellent electric conductivity and spring capacity in an electrostatic field and are very suitable for electrostatic flocking. The polycaprolactam flock has a tannin content of 1.7 percent and an antimony content of 0.08 percent. The polyethylene terephthalate flock has a tannin content of 1.0 percent and a total antimony content of 0.07 percent. As a control sample of untreated polyethylene terephthalate flock was found to contain 0.03 percent of antimony, this has to be deducted from the total antimony content of the treated flock, resulting in an antimony content of 0.04 percent due to the coating. The polyacrylonitrile flock has a tannin content of 0.5 percent and an antimony content of 0.02 percent, while the cellulose triacetate flock has a tannin content of 0.8 percent and an antimony content of 0.02 percent. All percentages mean percent by weight of the total flock weight.

EXAMPLE V 40 grams of polyhexamethylene adipamide flock of 2 denier and 1 mm. length are treated as in Example IV with the difference that 2 grams of 98% acetic acid and 1.6 grams of tannin are used. The flock obtained possesses a good flow and excellent electric conductivity and spring capacity in an electrostatic field and is very suitable for electrostatic flocking. The tannin content of the flock is 1.6 percent by weight, and the antimony content of the flock is 0.05 percent by weight.

40 grams of polyhexamethylene adipamide flock of 18 denier and 4.5 mm. length are treated as in Example IV with the difference that 0.4 gram of potassium antimonyl tartrate are used. The flock obtained possesses a good flow and excellent electric conductivity and spring capacity in an electrostatic field and is very suitable for electrostatic flocking. The tannin content of the flock is 0.4 percent by weight, and the antimony content of the flock is 0.03 percent by weight.

EXAMPLE VI 40 grams of polyhexamethylene adipamide flock of 2 denier and 1 mm. length are dispersed in 1000 grams of an aqueous solution of 70° C. containing 3 grams of 98% acetic acid and 0.2 gram of potassium aluminum sulphate. The dispersion is stirred, 0.4 gram of tannin is added, and stirring is continued for 10 minutes, 0.1 gram of potassium antimonyl tartrate is added, and the dispersion is stirred for another 10 minutes. The flock is centrifuged for 10 minutes and dispersed in 1000 grams of an aqueous solution of 50° C. containing 8 grams of ammonium sulphate and 3 grams of an anionic finishing agent consisting of a mixture of cetyl alcohol and cetyl alcohol ammonium sulfonate. The dispersion is stirred for 25 minutes, the flock is centrifuged for 10 minutes, and is dried at 25° C. The flock possesses a good flow and excellent electric conductivity and spring capacity in an electrostatic field and is very suitable for electrostatic flocking. The flock contains 0.006 percent of aluminum, 0.8 percent of tannin, and 0.02 percent of antimony, all percentages meaning percent by weight.

The present invention may be embodied in other specific forms without departing from the spirit or essential attributes thereof and, accordingly, reference should be made to the appended claims, rather than to the foregoing specification as indicating the scope of the invention.

We claim:
1. Individually discrete flock fibers having a length of between 0.1 to 10 millimeters of a polymer selected from the group consisting of polyamides, polyesters, polyacrylonitriles, and cellulose esters possessing good electrical conductivity and excellent spring capacity in an electrostatic field and suitable for electrostatic flocking, said flock fibers being coated with a composition consisting essentially of, in percent of the weight of the flock fibers, about 0.1 to 3.0% of tannin and about 0.01 to 0.3% of antimony (such antimony being derived from a compound selected from the group consisting of potassium antimonyl tartrate, antimony trifluoride, potassium antimony fluoride, antimony lactate, or antimony sodium thioglycolate).

2. Individually discrete flock fibers having a length of between 0.1 to 10 millimeters of a polymer selected from the group consisting of polyamides, polyesters, polyacrylonitriles, and cellulose esters possessing good electrical conductivity and excellent spring capacity in an electrostatic field and suitable for electrostatic flocking, said flock fibers being coated with a composition consisting essentially of, in percent of the weight of the flock fibers, about 0.1 to 3.0% of tannin, about 0.01 to 0.3% of antimony (such antimony being derived from a compound selected from the group consisting of potassium antimonyl tartrate, antimony trifluoride, potassium antimony fluoride, antimony lactate, or antimony sodium thioglycolate), and about 0.001 to 0.03% of aluminum (such aluminum being derived from a water-soluble aluminum salt).

3. Flock fibers as claimed in claim 1, being coated, in addition, with a water-soluble salt of an alkali metal or ammonium, and an anionic finishing agent.

4. Flock fibers as claimed in claim 1, being coated, in addition with ammonium sulphate and a mixture of cetyl alcohol and cetyl alcohol ammonium sulfonate.

5. Flock fibers as claimed in claim 1, wherein the polyamide is selected from the group consisting of polyhexamethylene adipamide and polycaprolactam.

6. Flock fibers as claimed in claim 1, wherein the polyester is polyethylene terephthalate.

7. Flock fibers as claimed in claim 1, wherein the cellulose ester is cellulose triacetate.

References Cited

UNITED STATES PATENTS 3,190,850   6/1965   Burke ---------------- 260—38

FOREIGN PATENTS 591,284   1/1960   Canada.

OTHER REFERENCES

Dupont: "Dye Resist Process For Nylon," The Technical Bulletin, Dupont, vol. 5, No. 2, June 1949, pp. 50–51.

ALFRED L. LEAVITT, Primary Examiner

C. K. WEIFFENBACH, Assistant Examiner

U.S. Cl. X.R.

117—17, 26, 33, 69, 138.8, 140, 143, 201